(12) United States Patent
Barrera et al.

(10) Patent No.: US 10,741,925 B2
(45) Date of Patent: Aug. 11, 2020

(54) ELECTRONIC DEVICE WITH SUPPORT STRUCTURE ANTENNAS

(71) Applicant: Apple Inc., Cupertino, CA (US)

(72) Inventors: Joel D. Barrera, San Jose, CA (US); James M. Cuseo, Cupertino, CA (US); Jerzy S. Guterman, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 135 days.

(21) Appl. No.: 15/933,162

(22) Filed: Mar. 22, 2018

(65) Prior Publication Data

US 2019/0296442 A1    Sep. 26, 2019

(51) Int. Cl.
| | |
|---|---|
| *H01Q 13/10* | (2006.01) |
| *H04B 1/40* | (2015.01) |
| *H01Q 1/22* | (2006.01) |
| *H04B 1/00* | (2006.01) |

(52) U.S. Cl.
CPC ........... *H01Q 13/10* (2013.01); *H01Q 1/2266* (2013.01); *H01Q 1/2291* (2013.01); *H04B 1/0064* (2013.01); *H04B 1/40* (2013.01)

(58) Field of Classification Search
CPC ................................. H01Q 13/10; H01Q 1/22
USPC ......................................................... 343/770
See application file for complete search history.

(56) References Cited

U.S. PATENT DOCUMENTS

| | | | |
|---|---|---|---|
| 9,627,769 B2 | 4/2017 | Koo et al. | |
| 2005/0146475 A1* | 7/2005 | Bettner | ................. G06F 1/1616 343/767 |
| 2009/0140937 A1 | 6/2009 | Chow et al. | |

* cited by examiner

*Primary Examiner* — Andrea Lindgren Baltzell
(74) *Attorney, Agent, or Firm* — Treyz Law Group, P.C.; G. Victor Treyz; Matthew R. Williams

(57) ABSTRACT

An electronic device such as a desktop computer may have a housing. The housing may have conductive portions such as metal walls and metal support structures that support the housing. The walls may be assembled to form a box-shaped housing having corners. The support structures may form legs at the corners of the housing. Antennas may be formed in the housing to support communications such as wireless local area network communications. The antennas may be slot antennas formed from openings in the legs. Radio-frequency transceiver circuitry in the housing may be used to transmit and receive radio-frequency communications. The radio-frequency transceiver circuitry may be coupled to the antenna using a transmission line. Threaded radio-frequency connectors or other connectors may be used in coupling the transmission line to a slot antenna.

22 Claims, 6 Drawing Sheets

200~# ELECTRONIC DEVICE WITH SUPPORT STRUCTURE ANTENNAS

FIELD

This relates to electronic devices, and more particularly, to electronic devices with wireless communications circuitry.

BACKGROUND

Electronic devices are often provided with wireless communications capabilities. An electronic device with wireless communications capabilities has wireless communications circuitry with one or more antennas. Wireless transceiver circuitry in the wireless communications circuitry uses the antennas to transmit and receive radio-frequency signals.

It can be challenging to form a satisfactory antenna for an electronic device. If care is not taken, the antenna may not perform satisfactorily, may be overly complex to manufacture, or may be difficult to integrated into a device.

SUMMARY

An electronic device such as a desktop computer may have a housing. The housing may have conductive portions such as metal walls. The metal walls may be planar walls that form a box-shaped housing. Metal supports for a housing such as housing legs may be coupled to the corners of the housing. The metal legs may run vertically along each of four corners of a box-shaped housing or may otherwise be used in supporting the electronic device.

The electronic device may have wireless circuitry for transmitting and receiving wireless communications. The wireless circuitry may include antennas and radio-frequency transceiver circuitry.

The antennas may be formed in conductive portions of the housing. In an illustrative configuration, the antennas may be slot antennas formed from through holes in the legs. Radio-frequency transceiver circuitry in the housing that is used in transmitting and receiving radio-frequency communications may be coupled to each antenna using a corresponding transmission line. Threaded radio-frequency connectors or other connectors may be used in coupling each transmission line to a corresponding slot antenna.

DETAILED DESCRIPTION

Figure 1:
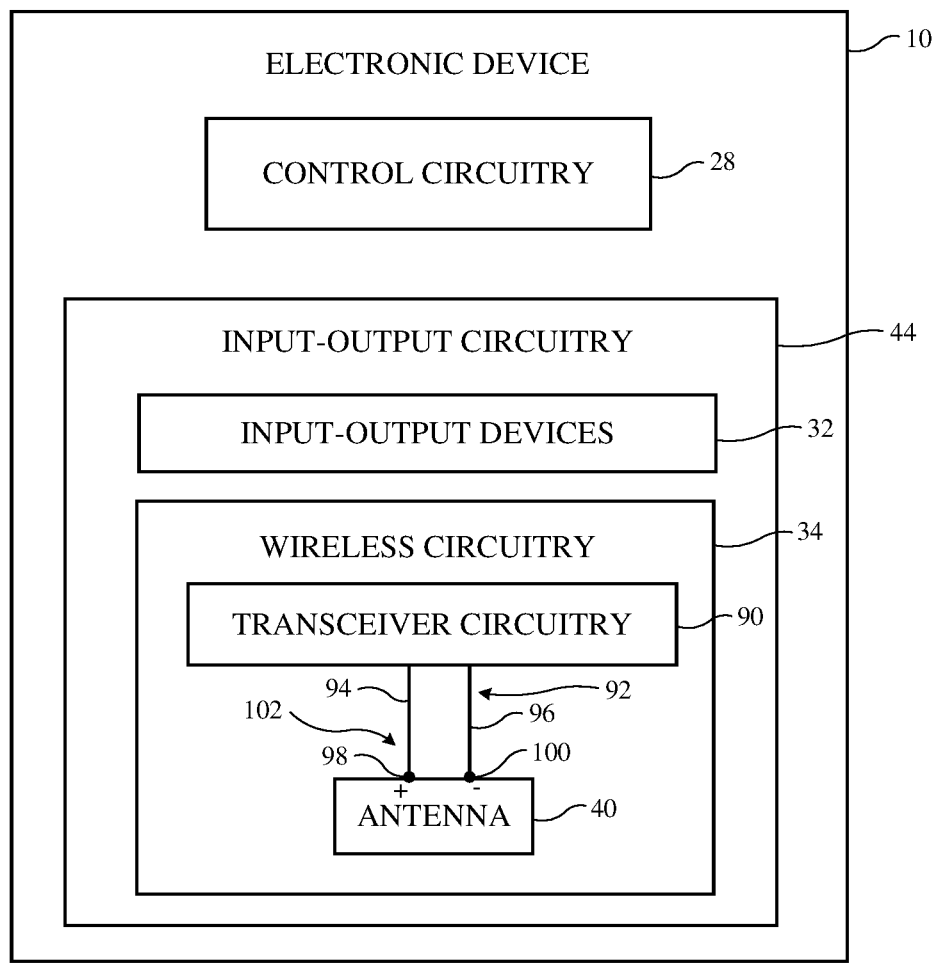
FIG. 1 is a schematic diagram of an illustrative electronic device in accordance with an embodiment.

An electronic device such as electronic device 10 of FIG. 1 may be provided with wireless circuitry. The wireless circuitry may include antennas such as wireless local area network antennas or other antennas. Electronic device 10 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, equipment that implements the functionality of two or more of these devices, or other electronic equipment.

As shown in FIG. 1, device 10 may include storage and processing circuitry such as control circuitry 28. Circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in circuitry 28 may be used to control the operation of device 10. This processing circuitry may be based on one or more microprocessors, microcontrollers, digital signal processors, application specific integrated circuits, etc.

Circuitry 28 may be used to run software on device 10, such as internet browsing applications, voice-over-internet-protocol (VOIP) telephone call applications, email applications, media playback applications, reminder list applications, calendar applications, shopping applications, home automation applications, applications for setting alarms and timers, operating system functions, etc. To support interactions with external equipment, circuitry 28 may be used in implementing communications protocols. Communications protocols that may be implemented using circuitry 28 include internet protocols, wireless local area network protocols (e.g., IEEE 802.11 protocols—sometimes referred to as WiFi®—and protocols for other short-range wireless communications links such as the Bluetooth® protocol), cellular telephone protocols, antenna diversity protocols, etc.

Input-output circuitry 44 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices 32 may include touch sensors, displays, light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), etc. In some configurations, keyboards, headphones, displays, pointing devices such as trackpads, mice, and joysticks, and other input-output devices may be coupled to device 10 using wired or wireless connections (e.g., some of input-output devices 32 may be peripherals that are coupled to a main processing unit or other portion of device 10 via a wired or wireless link).

Input-output circuitry 44 may include wireless circuitry 34 to support wireless communications. Wireless circuitry 34 may include radio-frequency (RF) transceiver circuitry 90 formed from one or more integrated circuits, power amplifier circuitry, low-noise input amplifiers, passive RF components, one or more antennas such as antenna 40, transmission lines such as transmission line 92, and other circuitry for handling RF wireless signals. Wireless signals can also be sent using light (e.g., using infrared communications).

Radio-frequency transceiver circuitry 90 may include wireless local area network transceiver circuitry to handle 2.4 GHz and 5 GHz bands for WiFi® (IEEE 802.11) wireless local area network communications and may include Bluetooth® circuitry to handle the 2.4 GHz Bluetooth® communications band. If desired, circuitry 90 may handle other bands such as cellular telephone bands, near-field communications bands (e.g., 13.56 MHz), millimeter wave bands (e.g., communications at 60 GHz), and/or other communications bands. Configurations in which radio-frequency transceiver circuitry 90 handles wireless local area network bands (e.g., 2.4 GHz and 5 GHz) may sometimes be described herein as an example. In general, however, circuitry 90 may be configured to cover any suitable communications bands of interest.

Wireless circuitry 34 may include one or more antennas such as antenna 40. Antennas such as antenna 40 may be formed using any suitable antenna types. For example, antennas in device 10 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Parasitic elements may be included in antennas 40 to adjust antenna performance. In some configurations, device 10 may have isolation elements between respective antennas 40 to help avoid antenna-to-antenna cross-talk. Different types of antennas may be used for different bands and combinations of bands. For example, one type of antenna may be used in forming a local wireless link antenna and another type of antenna may be used in forming a remote wireless link antenna. In some configurations, different antennas may be used in handling different bands for transceiver circuitry 90. Each antenna 40 may cover one or more bands. For example, antennas 40 may be single band wireless local area network antennas or dual band wireless local area network antennas.

As shown in FIG. 1, radio-frequency transceiver circuitry 90 may be coupled to antenna feed 102 of antenna 40 using transmission line 92. Antenna feed 102 may include a positive antenna feed terminal such as positive antenna feed terminal 98 and may have a ground antenna feed terminal such as ground antenna feed terminal 100. Transmission line 92 may be formed from metal traces on a printed circuit, cables, or other conductive structures and may have a positive transmission line signal path such as path 94 that is coupled to terminal 98 and a ground transmission line signal path such as path 96 that is coupled to terminal 100.

Transmission line paths such as transmission line 92 may be used to route antenna signals within device 10. Transmission lines in device 10 may include coaxial cables, microstrip transmission lines, stripline transmission lines, edge-coupled microstrip transmission lines, edge-coupled stripline transmission lines, transmission lines formed from combinations of transmission lines of these types, etc. Filter circuitry, switching circuitry, impedance matching circuitry, and other circuitry may be interposed within the paths formed using transmission lines such as transmission line 92 and/or circuits such as these may be incorporated into antenna 40 (e.g., to support antenna tuning, to support operation in desired frequency bands, etc.). During operation, control circuitry 28 may use transceiver circuitry 90 and antenna(s) 40 to transmit and receive data wirelessly. Control circuitry 28 may, for example, receive wireless local area network communications wirelessly using transceiver circuitry 90 and antenna(s) 40 and may transmit wireless local area network communications wirelessly using transceiver circuitry 90 and antenna(s) 40.

Figure 2:
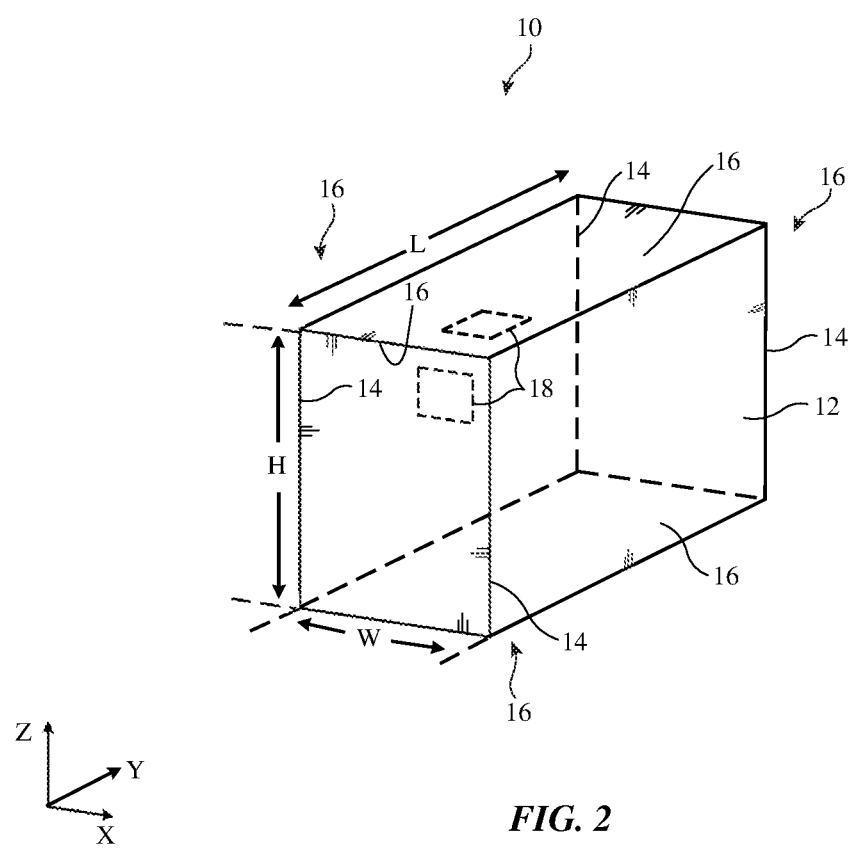
FIG. 2 is a perspective view of an illustrative electronic device in accordance with an embodiment.

A perspective view of an illustrative electronic device such as device 10 of FIG. 1 is shown in FIG. 2. In the example of FIG. 2, device 10 has a housing such as housing 12 with a rectangular box shape. In general, device 10 may have a housing with any suitable shape (e.g., a box shape with a different numbers of sides, pyramidal, cylindrical, conical, spherical, a shape with a combination of curved sides and planar sides, etc.). The box-shaped housing of FIG. 2 is illustrative. Housing 12, which may sometimes be referred to as an enclosure or case, may be formed of plastic, glass, ceramics, fiber composites, metal (e.g., stainless steel, aluminum, copper, brass, etc.), fabric, other suitable materials, or a combination of any two or more of these materials. Housing 12 may be formed using a unibody configuration in which some or all of housing 12 is machined or molded as a single structure or may be formed using multiple structures (e.g., an internal frame structure covered with one or more outer housing layers). Configurations for housing 12 in which housing 12 includes support structures (a stand, leg(s), handles, etc.) may also be used.

As shown in FIG. 2, housing 12 may be characterized by a width W, a height H, and a length L. The values of W, H, and L may be at least 1 mm, at least 10 mm, at least 100 mm, at least 300 mm, may be less than 1000 mm, less than 750 mm, may be less than 500 mm, may be less than 250 mm, or may be any other suitable value. In some configurations, housing 12 is low and wide (e.g., H may be less than W and less than L). In other configurations, housing 12 may be thinner and taller. For example, H may be at least two times W, at least 3 times W, or other suitably large value. If desired, L may be larger than W (e.g., L may be at least 1.5 times W, 2 times W, at least three times W, etc.). Other shapes and sizes may be used for housing 12 if desired. The example of FIG. 2 is illustrative.

Housing 12 may have edges such as edges that extend along the four corners 14 of housing 12 of FIG. 2 (e.g., the four corners of housing 12 when an outline of housing 12 is viewed from above). Each corner 14 may, for example, have an edge that extends vertically along vertical dimension Z. Housing walls such as planar housing walls 16 of FIG. 2 may be formed on the top and bottom of housing 12 (walls that lie parallel to the XY plane), the left and right sides of housing 12 (walls that lie parallel to the YZ plane), and/or on the front and rear sides of housing 12 (walls that lie parallel to the XZ plane). In this type of arrangement, walls 16 form an enclosure for device 10 that is a six-sided box.

Walls 16 may be formed from conductive material such as metal (e.g., aluminum, steel, etc.), other conductive materials, and/or insulating material (e.g., polymer, etc.). In some configurations, walls 16 or portions of walls 16 may have areas such as areas 18 to accommodate buttons and other input-output devices 32, ports for coupling to removable storage media, ports that facilitate coupling to peripherals (e.g., data ports), audio ports, etc. Areas 18 may be located on one or more of walls 16 (as an example). For example, an area 18 that contains a power port and data and display ports and may be located on the rear wall of housing 12.

One or more antennas such as antenna 40 of FIG. 1 may be formed in device 10 to handle wireless communications. In some configurations, antennas or parts of antenna may be formed from internal device components (e.g., antenna traces on printed circuit boards mounted within the interior of housing 12). In other configurations, antennas or parts of antennas may be formed from conductive housing structures. For example, conductive structures in housing 12 such as conductive walls 16 and/or conductive support structures for supporting walls 16 may be used in forming one or more antennas 40. These conductive electronic device housing structures may be provided with one or more openings to form slot antennas, inverted-F antennas, other antennas, hybrid antennas that include resonating elements of more than one type, etc.

Figure 3:
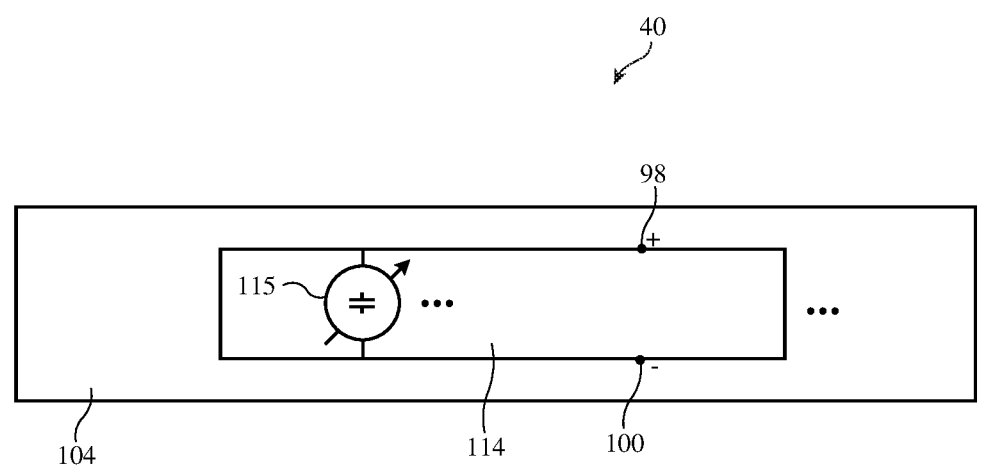
FIG. 3 is a side view of an illustrative electronic device slot antenna in accordance with an embodiment.

An illustrative slot antenna configuration for antenna 40 is shown in FIG. 3. As shown in FIG. 3, conductive structures 104 may have one or more openings such as opening 114 that are fully and/or partially filled with a gaseous dielectric such as air and/or a solid dielectric such as polymer, glass, ceramic, and/or other solid insulating material. Positive signal line 94 in transmission line 92 (FIG. 1) may be coupled to positive antenna feed terminal 98 and ground signal line 96 of transmission line 92 (FIG. 1) may be coupled to ground antenna feed terminal 100. Radio-frequency connectors and other components may be used in coupling transmission line 92 to the antenna feed formed by terminals 98 and 100. Antenna feed terminals 98 and 100 may be coupled to respective portions of conductive structures 104 on opposing sides of opening 114 (e.g., on opposing sides of a slot or other gap in structures 104 that is filled with gaseous and/or solid dielectric).

In some configurations, conductive structures 104 may have an elongated shape (e.g., the shape of a rectangular bar or cylindrical rod having a diameter of at least 0.5 cm, at least 1 cm, at least 2 cm, less than 10 cm, less than 5 cm, etc.). As an example, conductive structures 104 may form elongated support structures for device 10 such as legs or other housing support structures in housing 12. In these configurations and other configurations for conductive structures 104, multiple openings 114 (e.g., elongated through holes such as rectangular slots, oval slots, rectangular slots with rounded corners, etc.) may be formed at two or more respective positions along the length of the conductive structures (e.g., at multiple locations along the length of a metal bar or rod).

Optional tuning components may be coupled to antenna 40. As an example, one or more antenna tuning components such as illustrative component 115 of FIG. 3 may bridge opening 114. Component 115 may be, for example, a tunable capacitor, a tunable inductor, a tunable component formed from a series of discrete components that can be selectively switched into or out of use with corresponding switching circuitry (e.g., a multiplexer coupled to a set of capacitors or a set of inductors to form, respectively, a tunable capacitor or tunable inductor), etc. Component 115 may have a first terminal coupled to conductive structures 104 on a first side of opening 114 and a second terminal coupled to conductive structures 104 on an opposing second side of opening 114 or may otherwise be coupled to conductive portions of antenna 40 and/or the circuitry associated with antenna 40 (e.g., matching circuits, etc.). In some configurations, component 115 may be formed in an elongated threaded member (sometimes referred to as an antenna tuning circuit bolt). Transmission line 92 may also be coupled to the feed for antenna 40 using an elongated threaded member such as a bolt (sometimes referred to as an antenna feed bolt). An antenna feed bolt may have positive and ground portions (terminals) that couple to conductive structures 104 on opposing sides of opening 114 and/or that are otherwise mounted to structures 104. The antenna feed bolt may be coupled to transmission line 92 using threaded radio-frequency connectors. If desired, other types of structures may be used in coupling transmission line 92 to the feed of antenna 40 (e.g., brackets, screws, soldered terminals, etc.). The use of an elongated threaded member illustrative.

Figure 4:
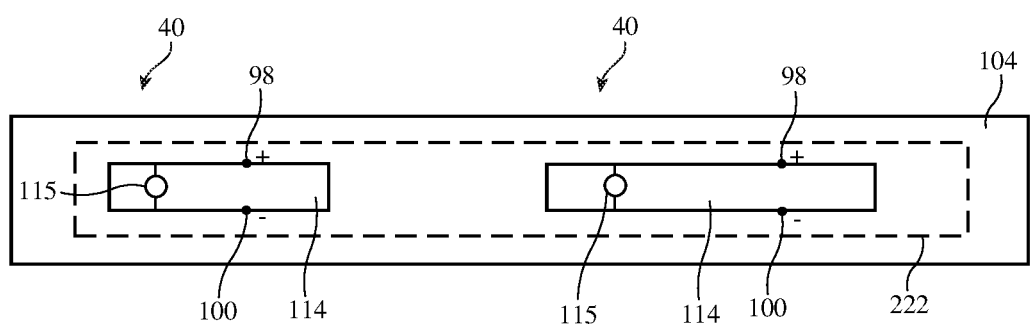
FIG. 4 is a side view of a pair of illustrative electronic device slot antennas in accordance with an embodiment.

FIG. 4 is a side view of illustrative elongated conductive structures 104 (e.g., a portion of housing 12 such as a leg or other support structure formed from metal or other conductive material). In the example of FIG. 4, there are two antennas 40. A first of antennas 40 may have a slot resonating element with a longer length (e.g., 61 mm, at least 30 mm, less than 90 mm, or other suitable length) and may be used to transmit and receive wireless local area network communications in a first band such as a 2.4 GHz wireless local area network communications band and a second of antennas 40 may have a slot resonating element formed from an opening 114 with a shorter length (e.g., 35 mm, at least 13 mm, at least 20 mm, less than 60 mm, less than 45 mm, etc.) and may be used to transmit and receive wireless local area network communications in a second band such as a 5 GHz wireless local area network communications band.

In each antenna 40, conductive structures 104 may have portions on opposing sides of a respective opening 114 (e.g., a through-hole opening with a rectangular outline or other suitable shape). A threaded antenna feed member with threads that engage threads in a hole in conductive structures 104 or other feed structure may be used to couple transmission line to feed terminals 98 and 100 in each antenna 40. Antennas 40 may be any suitable type of antenna (e.g., each antenna 40 may be a slot antenna, an inverted-F antenna, a hybrid slot-inverted-F antenna, and/or other suitable antenna). In the example of FIG. 4, each antenna 40 is a slot antenna having a slot antenna resonating element formed from an elongated opening 114 in conductive structures 104. A cover that is formed from insulating material (e.g., polymer, etc.) and/or a pair of separate covers may be used to cover antennas 40, as shown by illustrative cover 222. There may be separate covers for each antenna 40 on opposing entrance and exit sides of opening 114.

Figure 5:
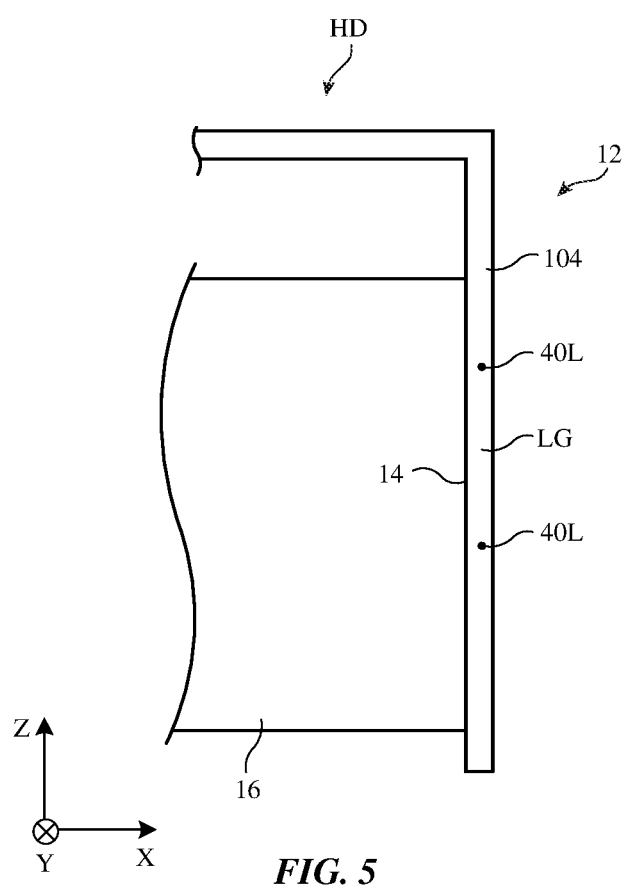
FIG. 5 is a side view of a corner portion of an illustrative electronic device of the type shown in FIG. 2 in accordance with an embodiment.

FIG. 5 is a front view of a corner portion of device 10. In the illustrative configuration of FIG. 5, conductive structures 104 form a housing support structure such as a vertical leg (leg LG). Each leg of housing 12 such as illustrative leg LG of FIG. 5 may run vertically along a respective corner 14 of housing 12, parallel to the Z axis. A horizontal housing member such as member HD may be coupled to an upper portion of leg LG and may serve as a handle (e.g., a handle attached to a pair of legs LG on the top front of housing 12, as an example).

Antennas 40 may be located at one or more locations along the length of leg LG, as shown by illustrative antenna locations 40L. Housing 12 may have four legs LG located, respectively at each of the four corners 14 of housing 12. One or more of these legs, two or more of these legs, three or more of these legs, or four or more of these legs may each be configured to form one or more antennas 40. Configurations for device 10 with more than four legs or fewer than four legs or with housing support structures of other shapes (e.g., housing stands having L-shaped stands or T-shaped stands formed from conductive structures 104) may also be used.

Figure 6:
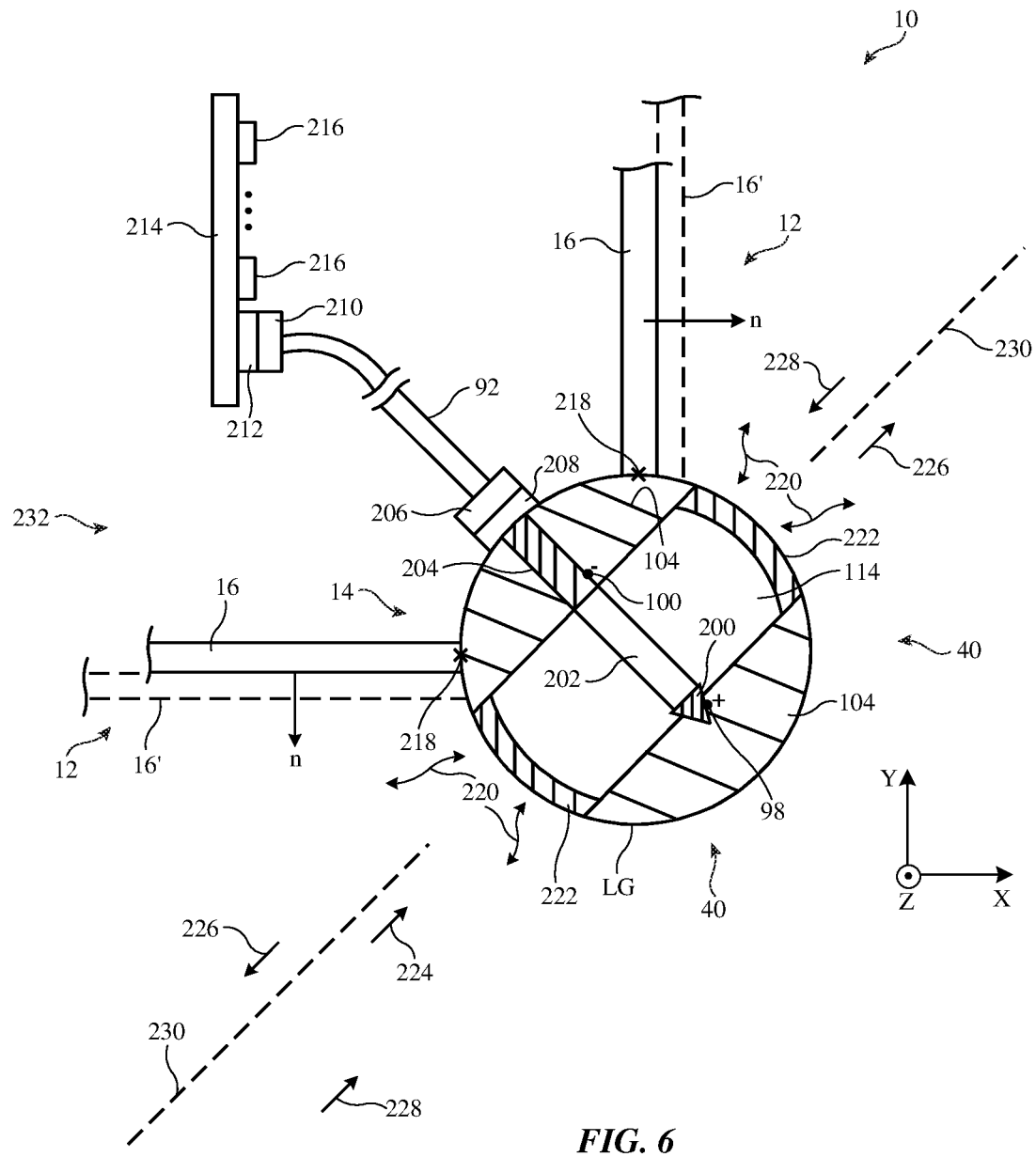
FIG. 6 is a cross-sectional top view of an illustrative slot antenna formed from a through hole that passes through a support structure such as a leg at a corner of an electronic device in accordance with an embodiment.

A top view of an illustrative slot antenna formed from conductive structures 104 in a housing leg such as leg LG located at one of the four corners 14 of device housing 12 in device 10 is shown in FIG. 6. As shown in FIG. 6, conductive structures 104 of leg LG may have a circular outline (leg LG may be a cylindrical rod). Configurations in which leg LG has other outlines (square, hexagonal, oval, triangular, other shapes with straight and/or curved edges, etc.) may also be used. Opening 114 may form a through hole that has a rectangular outline or other suitable shape when viewed in direction 224 (as shown in FIGS. 3 and 4). Through-hole opening 114 passes from one side of leg LG to the other. As a result, radio-frequency signals 220 can be transmitted and received efficiently without being blocked by housing walls 16.

As shown in FIG. 6, radio-frequency signals 220 can be transmitted outwardly in opposing directions 226 and incoming radio-frequency signals 220 can be received inwardly in opposing directions 228. This provides antenna 30 with wide coverage (e.g., high antenna efficiency over a wide range of angles), particularly when through-hole axis 230 for opening 114 is oriented at a 45° angle with respect to the X axis and Y axis (and at 45° with respect to the surface normals n of the vertical sidewalls 16 of device 10, such as the sidewalls 16 with perpendicular surface normal n that are shown in FIG. 6). The X axis and Y axis of FIG. 6 lie parallel respectively to the front and side walls 16 of housing 12. When oriented in this way, through-hole axis 230 is oriented at a 45° angle (within 5°, 10°, 15°, or other suitable alignment tolerance) with respect to surface normal n of the front, rear, left, and right walls 16 of housing 12.

Leg LG may be attached to housing walls 16 using coupling structures 218 (e.g., welds, fasteners, solder, adhesive, interlocking engagement structures, and/or other attachment mechanisms). The housing walls 16 that are attached to legs LG of housing 12 in this way may extend over the entire sides of device 12 and/or walls 16 may be configured to form small protruding plates 16 near legs LG that are mounted to additional overlapping housing panels (e.g., housing walls 16' that extend over the sides of device 12). Other arrangements for coupling housing walls of housing 12 to legs LG may be used, if desired.

Antenna 40 of FIG. 6 may be fed using an elongated antenna feed member such as member 202 that extends across opening 114 or other suitable antenna feed structure. In the illustrative configuration of FIG. 6, member 202 has a first portion (first shaft portion 202) that extends through a through hole in a first portion of conductive structures 104. A second portion of conductive structures 104 that lies on an opposing side of opening 114 may have a recess or other opening (e.g., a through hole) that receives tip portion 200 of the elongated antenna feed member.

Portion 204 may be threaded and may engage threads on the through hole in the first portion of structures 104 or portion 200 can be threaded and may engage threads on the second portion of conductive structures 104. Configurations in which both ends of elongated antenna feed member 202 are threaded or in which both ends of elongated antenna feed member 202 are unthreaded may also be used. Elongated antenna feed member 202 may have a head with a hexagonal shape or other shape configured to be tightened with a wrench or other tool and may therefore sometimes be referred to as an antenna feed bolt.

Antenna feed terminal 100 may be formed by shorting portion 204 of member 202 to a first portion of conductive structures 104 and antenna feed terminal 98 may be formed by shorting tip 200 of elongated member 202 to a second portion of conductive structures 104 on an opposing side of opening 114. Member 202 may bridge opening 114 and may have a coaxial signal path configuration. With this arrangement, a central conductive core member may serve as a positive signal path and may be shorted to tip 200 while a surrounding outer cylindrical shell formed from metal or other conductive material may serve as a ground signal path and may be shorted to portion 204 of member 202. Dielectric may be used to separate the conductive core from the surrounding shell. The central core of member 202 may be shorted to a positive signal conductor in connector 208 of member 202. The outer ground shell of member 202 may be shorted to a ground signal conductor in connector 208.

Transmission line 92 may be used to couple the antenna feed formed from member 202 and terminals 98 and 100 to radio-frequency transceiver circuitry 90 (FIG. 1). As shown in FIG. 6, transceiver circuitry 90 and other circuitry (e.g., control circuitry 20, input-output circuitry 44, etc.) may be implemented using electrical components 216 (e.g., integrated circuits, etc.) on one or more printed circuits 214. Radio-frequency connectors or other coupling mechanisms may be used in coupling transmission line 92 between antenna 40 and printed circuit 214.

If desired, antenna feed member 202 may be pigtailed to transmission line 92 (e.g., a coaxial cable). Alternatively, member 202 may have a radio-frequency connector such as connector 208 of FIG. 6 that mates with connector 206 on transmission line 92 (e.g., using mating threads). Printed circuit 214 and the circuitry of printed circuit 214 such as components 216 and radio-frequency connector 212 may be mounted in interior portion 232 of housing 12.

Printed circuit 214 may be a rigid printed circuit board (e.g., a printed circuit formed from rigid substrate material such as fiberglass-filled epoxy) or may be a flexible printed circuit (e.g., a flex circuit formed from a sheet of polyimide or a layer of other flexible polymer). Components 216 may include, for example, integrated circuits and other circuitry for transceiver circuitry 90 and other circuitry in device 10.

Transmission line 92 may be a coaxial cable or other suitable transmission line for coupling the circuitry of printed circuit 214 (e.g., transceiver circuitry 90) to antenna 40. Transmission line 92 may have opposing first and second ends. The first end of the cable may have a first radio-frequency cable connector such as first connector 210. The opposing second end of the cable may have a second radio-frequency cable connector such as second connector 206. First connector 210 may be configured to mate with a radio-frequency connector such as printed circuit connector 212 on printed circuit 214 (e.g., a connector that is soldered to metal traces in the circuitry of printed circuit 214). Second connector 206 may be configured to mate with a corresponding radio-frequency connector that is coupled to and/or forms a part of elongated member 202 such as connector 208. Connectors such as connector 212, 210, 206, and 208 may be any suitable radio-frequency connectors such as MCX (micro coaxial connector) connectors, other coaxial connectors such as connectors that attach with clips, stab-in connectors, SMA (subminiature version A) connectors, etc. The use of threaded radio-frequency cable connectors such as MCX connectors for forming connectors 212, 210, 206, and 208 is illustrative.

As shown in FIG. 6, connector 212 mates with connector 210 to couple transmission line 92 to printed circuit 214 and transceiver circuitry 90 and other electrical components 216 on printed circuit 214. Connector 206 mates with connector 208 of antenna feed member 202 to couple transmission line 92 to antenna 40. If desired, circuitry in components 216 and/or circuitry associated with structures 104 may include antenna tuning circuits, impedance matching circuitry, switches, impedance monitoring circuits, filters, and/or other radio-frequency circuitry. This circuitry may, if desired, be interposed between transceiver circuitry 90 and transmission line 92 and/or between transmission line 92 and antenna 40. Configurations in which transmission line 92 is formed from one or more linked transmission line segments with intervening blocks of tuning circuitry, impedance matching circuitry, switches, impedance monitoring circuitry, filters, and/or other radio-frequency circuitry may also be used.

Antennas 40 in device 10 may be formed using any suitable type of antenna (e.g., slot antennas, inverted-F antennas, patch antennas, monopole antennas, dipole antennas, Yagi antennas, planar inverted-F antennas, loop antennas, other antennas, hybrid antennas that are formed from antenna resonating elements of different types, etc.). These antennas may include, for example, one or more antennas such as single-band or dual-band antennas for supporting wireless local area network (WiFi®) communications and/or other wireless communications.

In the example of FIG. 6, antenna 40 is a slot antenna formed from a through hole (opening 114) that passes through leg LG formed from conductive structures 104. Other types of antenna may be used, if desired. There may be multiple antennas 40 in each of one or more legs LG. For example, a given leg LG in device 10 may include a first antenna 40 for handling 2.4 GHz wireless local area network communications and a second antenna 40 for handling 5 GHz wireless local area network communications.

To block internal components such as feed member 202 from view, one or more antennas 40 may be covered with a cosmetic insulating layer. For example, opening 114 may be covered with a cosmetic dielectric cover such as cover 222. Cover 222 may be formed from polymer, glass, ceramic, or other solid dielectric. The interior of opening 114 may be filled with a gaseous dielectric and/or solid dielectric. In configurations for leg LG in which leg LG is cylindrical, cover 222 may have a matching cylindrical shape (e.g., so that the outer surfaces of cover 222 and leg LG match and so that the external surface of cover 222 lies flush with the surrounding portions of the external surface of leg LG).

As shown in FIG. 4, cover 222 may include a single cover member (e.g., a curved plastic member or other insulating structure) that spans multiple antennas 40. If desired, separate covers 222 may be provided for each antenna 40 (e.g., four covers 222 may be used to cover the respective front and rear sides of the two openings 114 in a pair of antennas 40). The use of a single cover member (for each side of leg LG) that overlaps multiple openings 114 in conductive structures 104 and thereby serves as a shared cover for multiple slot antennas is illustrative.

The foregoing is merely illustrative and various modifications can be made to the described embodiments. The foregoing embodiments may be implemented individually or in any combination.

What is claimed is:

1. An electronic device, comprising:
an electronic device housing supported by at least one leg;
a slot antenna formed from an opening that passes through the leg;
radio-frequency transceiver circuitry within the electronic device housing that is configured to transmit and receive wireless communications; and
a transmission line coupled between the radio-frequency transceiver circuitry and the slot antenna.

2. The electronic device defined in claim 1 wherein the electronic device housing has a box shape with corners and the leg is coupled to a given one of the corners.

3. The electronic device defined in claim 2 wherein the leg comprises an elongated metal member that runs along an edge of the electronic device housing at the given one of the corners.

4. The electronic device defined in claim 3 wherein the elongated metal member is a metal rod and the opening is a through hole with a rectangular outline.

5. The electronic device defined in claim 4 wherein the slot antenna has first and second antenna feed terminals coupled to first and second portions of the metal rod that are respectively on opposing first and second sides of the opening.

6. The electronic device defined in claim 5 wherein the metal rod comprises a cylindrical rod.

7. The electronic device defined in claim 1 wherein the leg has an additional opening and the electronic device further comprises an additional slot antenna formed from the additional opening.

8. The electronic device defined in claim 7 wherein the slot antenna is configured to operate in a 2.4 GHz communications band and wherein the additional slot antenna is configured to operate in a 5 GHz communications band.

9. The electronic device defined in claim 1 wherein the transmission line comprises a coaxial cable with a threaded radio-frequency connector and wherein the slot antenna has a feed structure with a mating threaded radio-frequency connector.

10. The electronic device defined in claim 1 wherein the electronic device housing has at least first and second planar walls having respective surface normals that are perpendicular to each other and wherein the opening passes through the leg at an angle of 45° with respect to each of the surface normals.

11. The electronic device defined in claim 10 wherein the leg comprises a cylindrical rod.

12. The electronic device defined in claim 11 wherein the slot antenna is configured to operate in at least one wireless local area network band.

13. The electronic device defined in claim 12 further comprising at least one dielectric cover that covers the opening and has a curved surface that lies flush with an outer surface of the leg.

14. A desktop computer, comprising:
a box-shaped housing having metal walls and metal legs;
input-output circuitry in the box-shaped housing;
control circuitry coupled to the input-output circuitry;
radio-frequency transceiver circuitry coupled to the control circuitry that the control circuitry is configured to use to transmit and receive wireless communications;
a slot antenna formed from a through hole in a given one of the metal legs; and
a transmission line coupled between the radio-frequency transceiver circuitry and the slot antenna.

15. The desktop computer defined in claim 14 wherein the given one of the metal legs runs along a corner of the box-shaped housing and the transmission line comprises a coaxial cable, the slot antenna comprising a feed structure with a threaded radio-frequency connector to which the transmission line is coupled.

16. The desktop computer defined in claim 14 wherein the metal leg is a cylindrical rod at a corner of the box-shaped housing.

17. The desktop computer defined in claim 16 further comprising a solid dielectric cover that overlaps the through hole.

18. An electronic device, comprising:
- a housing with first and second metal walls having first and second edges that are joined along a corner of the housing;
- an elongated conductive housing support structure that runs along at least part of the first and second edges at the corner; and
- an antenna in the elongated conductive housing support structure.

19. The electronic device defined in claim 18 wherein the antenna comprises a slot antenna formed from a slot in the elongated conductive housing support structure wherein the slot overlaps the corner.

20. The electronic device defined in claim 19 wherein the elongated conductive housing support structure comprises a metal leg that supports the housing and wherein the antenna is configured to transmit and receive wireless signals in a wireless local area network communications band.

21. The electronic device defined in claim 1 wherein the electronic device housing has opposing upper and lower surfaces, the radio-frequency transceiver circuitry is interposed between the upper and lower surfaces, and the at least one leg protrudes below the lower surface.

22. The electronic device defined in claim 14 wherein the given one of the metal legs has a curved surface.

* * * * *